US007131009B2

(12) United States Patent
Scheidt et al.

(10) Patent No.: US 7,131,009 B2
(45) Date of Patent: Oct. 31, 2006

(54) MULTIPLE FACTOR-BASED USER IDENTIFICATION AND AUTHENTICATION

(75) Inventors: Edward M. Scheidt, McLean, VA (US); Ersin Domangue, Woodbine, MD (US)

(73) Assignee: Tecsec, Inc., Vienna, VA (US)

( * ) Notice: Subject to any disclaimer, the term of this patent is extended or adjusted under 35 U.S.C. 154(b) by 118 days.

(21) Appl. No.: 10/993,216

(22) Filed: Nov. 18, 2004

(65) Prior Publication Data

US 2005/0154924 A1 Jul. 14, 2005

Related U.S. Application Data

(63) Continuation of application No. 10/060,039, filed on Jan. 30, 2002, now Pat. No. 6,845,453, and a continuation-in-part of application No. 09/023,672, filed on Feb. 13, 1998, now Pat. No. 6,885,747, and a continuation-in-part of application No. 08/974,843, filed on Nov. 20, 1997, now abandoned.

(60) Provisional application No. 60/264,716, filed on Jan. 30, 2001.

(51) Int. Cl.
*H04L 9/00* (2006.01)
*H04K 1/00* (2006.01)

(52) U.S. Cl. .................... 713/182; 713/166; 713/168; 713/176; 713/183; 713/184; 713/185; 713/1; 726/2; 726/5; 726/8; 726/9; 726/10; 726/20; 705/67

(58) Field of Classification Search ............... 713/166, 713/168, 176, 182–185, 186; 705/67; 726/2, 726/5, 8–10, 20

See application file for complete search history.

(56) References Cited

U.S. PATENT DOCUMENTS

| 5,280,527 | A  | * | 1/1994  | Gullman et al. ............ 713/184 |
| 6,041,410 | A  | * | 3/2000  | Hsu et al. ................... 713/186 |
| 6,317,834 | B1 | * | 11/2001 | Gennaro et al. ............ 713/186 |
| 6,401,206 | B1 | * | 6/2002  | Khan et al. ................. 713/176 |
| 6,490,680 | B1 | * | 12/2002 | Scheidt et al. ............. 713/166 |
| 6,845,453 | B1 | * | 1/2005  | Scheidt et al. ................. 726/5 |

OTHER PUBLICATIONS

P. R. Parthasarathy et al., Resolving Webuser on the fly, ACM SIGCAS Computers and Society, vol. 32, Iss. 2, Jun. 2002, pp. 4-9.*

* cited by examiner

*Primary Examiner*—Taghi T. Arani
(74) *Attorney, Agent, or Firm*—IP Strategies

(57) ABSTRACT

A method of authenticating the identity of a user to determine access to a system includes providing a plurality of factor-based data instances corresponding to a user, evaluating the factor-based data instances to determine if the user's identity is authenticated, and granting or restricting the user's access to the system if the user's identity is authenticated. More particularly, the method includes providing a modified data instance based on a second data instance, generating a key based on a first data instance, applying the key to the a modified data instance to generate a recovered data instance, interrogating the recovered data instance against the second data instance to generate an authentication value as a result of a correspondence evaluation, and granting or restricting the user's access to the system based at least in part on the validity of the authentication value.

8 Claims, 6 Drawing Sheets

MULTIPLE FACTOR-BASED USER IDENTIFICATION AND AUTHENTICATION

CROSS-REFERENCE TO RELATED APPLICATIONS

This is a continuation of U.S. patent application Ser. No. 10/060,039, which was filed on Jan. 30, 2002, now U.S. Pat. No. 8,845,453, and is related to U.S. Provisional Patent Application Ser. No. 60/264,716, filed on Jan. 30, 2001. This is also a continuation-in-part of U.S. patent application Ser. No. 09/023,672, filed on Feb. 13, 1998 now U.S. Pat. No. 6,885,747, and of U.S. patent application Ser. No. 08/974,843, filed on Nov. 20, 1997 now abandoned. The disclosures of all the related applications are incorporated herein in their entireties.

FIELD OF THE INVENTION

The present invention is related to techniques for providing user identification, apparatus that enable user identification techniques, and systems that implement and utilize user identification techniques.

BACKGROUND OF THE INVENTION

There are many systems that require user access. Some have many users and require authorized users to log in. Some require user identification to access a particular portion or aspect of the system. Some contain personal information. There are many reasons to restrict access to these systems to authorized users. Authorized users have to be identified before access can be granted.

For example, computer systems and subsystems are well known in the art. For security and privacy purposes, some computer systems include user identification protocols to limit access to authorized or validated users. For example, protocols are often put in place to limit access to the system, to a particular subsystem or other portion of the system, to particular databases, or to certain applications, documents and portions of documents, objects, and workstations. As used herein, the term "system" will be used to mean any of these entities. Such validation protocols are useful to the extent that they can provide reliable identification of an authorized user, and do not mis-identify an unauthorized user.

A conventional user identification protocol requires users to submit knowledge-based data, such as a password and user ID, in order to gain access to a computer system. A submitted user ID may be used to reference a password associated with the user ID, with the passwords being compared to determine whether a particular user is authorized to access the system. A benefit of knowledge-based identification protocols is that access to requisite knowledge-based data can be totally unavailable to unauthorized entities, which increases the overall strength of the protocol. For example, a user is not required to record knowledge-based data anywhere other than in the user's memory, that is, in the user's brain.

However, most knowledge-based identification protocols suffer from an inherent problem. To prevent the hacking or spoofing of the knowledge-based data, the complexity of the data can be increased. For example, longer or more complicated passwords can be specified to make guessing of the password less likely. However, knowledge-based data that is too complex might result in an unacceptably high rate of false negatives (for example, forgotten and/or mistyped data) or in weakened password practice (for example, users might perceive the need to record such data in insecure ways, such as on paper, because the data is too difficult to memorize). Similarly, to avoid such problems, the complexities of the knowledge-based data can be decreased. However, such a decrease in complexity can increase the protocol's susceptibility to hacking or spoofing.

Another conventional user identification protocol requires users to submit possession-based data, such as an authorization code stored on an access pass (for example, a magnetic-stripe card or a smart card), and the submitted code is evaluated to determine user access. A benefit of possession-based identification protocols is that the requisite possession-based data can be extraordinarily complicated, in order to minimize the likelihood that such data is hacked or spoofed. Another benefit is that possession-based data does not require memorization of the data by a user, so that complexity limitations can be avoided.

However, possession-based identification protocols suffer from a potential weakness. Possession-based data (that is, the data stored on the token or other storage medium) can be stolen or lost. Thus, someone who steals or otherwise obtains a user's access pass can spoof the protocol by mere possession of the access pass. Likewise, if the access pass is lost, a "false negative" is assured until it is replaced.

Another conventional user identification protocol requires users to submit biometric-based data, such as a fingerprint scan, for example, and this biometric data is evaluated to determine user access. Such an identification protocol generally includes two stages: enrollment and identification. During enrollment, a biometric instance (such as a fingerprint scan) is obtained, and unique characteristics or features of the biometric instance are extracted to form a biometric template, which is stored as an enrollment template for subsequent identification purposes. Identification involves obtaining a subsequent biometric instance reading of the same type, extracting unique characteristics or features of the subsequent biometric instance to form a new template (the verification template), and comparing the two biometric templates to determine identification of the user. A benefit of biometric-based identification protocols is that the requisite biometric-based data is unique, which minimizes the likelihood of such data being hacked or spoofed. Another benefit is that biometric-based data also does not require memorization of the data by a user.

However, some biometric-based identification protocols suffer from potential weaknesses. Biometric-based data samples of a particular user can be inconsistent from one sampling to another, and therefore these protocols can be subject to false negatives. To improve the reliability of biometric samplings, a larger biometric measurement may be sampled, in order to reduce the likelihood of false negatives. For example, a commercial solution known as Bioscript™ (Bioscript, Inc., Mississauga, Ontario, Canada) utilizes such a methodology to account for distortions, such as cuts, scratches and other day-to-day variations of a user's fingerprint. However, increasing the size or scope of a biometric sample also increases the costs (such as electrical power, time, processing power, design and other implementation costs, training) incurred in utilizing a larger sample.

Therefore, it would be desirable to provide a method of identifying a user for access to a system that improves on conventional methods. It would also be desirable to provide an apparatus for enabling improved user identification techniques. It would also be desirable to provide a system to implement and utilize an improved method of identifying a user for access to a system. It would also be desirable to provide a computer-readable medium that stores instructions for controlling a computer to perform an improved method of identifying a user for access to a system.

BRIEF SUMMARY OF THE INVENTION

The present invention provides a method of validating a user for access to a system based on a number of user-provided factors. These factors can include, for example, any combination of what the user knows (that is, knowledge-based data); who the user is (that is, biometric-based data); what the user possesses (that is, token-based data; where the user is (that is, location-based data); and when the user is seeking validation (that is, time-based data). One or more additional factors can be substituted for or added to this list. A validated key is created by binding the factors together to provide authorization data. A validated key can be used directly, for example, as an access code, or indirectly, for example, to decrypt or allow access to an access code, or as keying data in a key management scheme, to access the system.

The present invention also provides an apparatus that validates a user for access to a system based on a number of user-provided factors. These factors can include, for example, any combination of what the user knows (that is, knowledge-based data); who the user is (that is, biometric-based data); what the user possesses (that is, token-based data; where the user is (that is, location-based data); and when the user is seeking validation (that is, time-based data). One or more additional factors can be substituted for or added to this list. A validated key is created by binding the factors together to provide authorization data. A validated key can be used directly, for example, as an access code, or indirectly, for example, to decrypt or allow access to an access code, or as keying data in a key management scheme, to access the system.

The present invention also provides a computer-readable medium that stores instructions that can cause a computer to validate a user for access to a system based on a number of user-provided factors. These factors can include, for example, any combination of what the user knows (that is, knowledge-based data); who the user is (that is, biometric-based data); what the user possesses (that is, token-based data; where the user is (that is, location-based data); and when the user is seeking validation (that is, time-based data). One or more additional factors can be substituted for or added to this list. A validated key is created by binding the factors together to provide authorization data. A validated key can be used directly, for example, as an access code, or indirectly, for example, to decrypt or allow access to an access code, or as keying data in a key management scheme, to access the system.

The present invention can further include at least one factor-reliability check, in which the factors provided by the user include plaintext data and encrypted data corresponding to the plaintext data. The encrypted data and the plaintext data are interrogated against each other to assess correspondence. Correspondence between the encrypted data and the plaintext data results in user validation, whereas a lack of correspondence does not result in user validation.

The factors can include possession-based data provided via a token, such that at least one aspect of the invention can be performed on or resides on the token, so that hacking or spoofing of the system of the invention is hindered.

According to an aspect of the present invention, a method of authenticating the identity of a user to determine access to a system includes providing a number of factor-based data instances corresponding to a user, evaluating the factor-based data instances to determine if the user's identity is authenticated, restricting the user's access to the system if the user's identity is not authenticated, and granting the user's access to the system if the user's identity is authenticated. An authentication value can be provided, based on the evaluation determination. Restricting the user's access can include denying the user's access. The factor-based data instances can include any combination of the following: a knowledge-based data instance, a possession-based data instance, and a biometric-based data instance.

According to another aspect of the present invention, a method of authenticating the identity of a user to determine access to a system includes providing a number of factor-based data instances corresponding to a user, including at least one modified data instance based on a second data instance of the plurality of factor-based data instances. A key ids generated based on a first data instance of the plurality of factor-based data instances, and applied to the at least one modified data instance to generate a recovered data instance. The recovered data instance is interrogated against the second data instance to generate an authentication value as a result of a correspondence evaluation. The user's access to the system is restricted based at least in part on an invalid authentication value, and granted based at least in part on a valid authentication value. The authentication value can be a first authentication value, in which case the first authentication value is combined with at least one other authentication value, to generate a combined authentication value. Restricting the user's access can include denying the user's access. The factor-based data instances can include any combination of the following: a knowledge-based data instance, a possession-based data instance, and a biometric-based data instance.

According to another aspect of the present invention, a method of authenticating the identity of a user to determine access to a system includes providing a possession-based data instance, a modified version of the possession-based data instance, a knowledge-based data instance, a biometric-based data instance, and a modified version of the biometric-based data instance. A key is generated based on the knowledge-based data instance, and applied to the modified version of the possession-based data instance to generate a first recovered data instance. The first recovered data instance is interrogated against the possession-based data instance to generate a possession value as a result of a first correspondence evaluation. The key is also applied to the modified version of the biometric-based data instance to generate a second recovered data instance. The second recovered data instance is interrogated against the biometric-based data instance to generate a biometric value as a result of a second correspondence evaluation. The key, the possession value, and the biometric value are combined to form an authentication value. The user's access to the system is restricted if the user's identity is not authenticated, based at least in part on the authentication value, and the user's access to the system is granted if the user's identity is authenticated, based at least in part on the authentication value. Restricting the user's access can include denying the user's access. The modified version of the biometric-based data instance can be a first modified version of the biometric-based data instance, in which case the biometric value is a second modified version of the biometric-based data instance. For example, the biometric value can be a cryptographic hash of the biometric-based data instance. Restricting the user's access to the system and granting the user's access to the system can be based on a modified version of the authentication value, for example, a cryptographic hash of the authentication value.

According to another aspect of the present invention, a method of authenticating the identity of a user to determine access to a system includes providing a possession-based data instance, a stored biometric-based data instance, and a read biometric-based data instance. The stored biometric-based data instance is interrogated against the read biometric-based data instance to generate a biometric value as a result of a correspondence evaluation, and the possession-based data instance and the biometric value are combined to form an authentication value, which is evaluated the authentication value to determine if the user's identity is authenticated. The user's access to the system is restricted if the user's identity is not authenticated, based at least in part on the authentication value, and the user's access to the system is granted if the user's identity is authenticated, based at least in part on the authentication value. Restricting the user's access can include denying the user's access. The biometric value can be a modified version of the biometric-based data instance, such as a cryptographic hash of the biometric-based data instance. Restricting the user's access to the system and granting the user's access to the system can be based on a modified version of the authentication value, such as a cryptographic hash of the authentication value.

According to another aspect of the present invention, a method of authenticating the identity of a user to determine access to a system includes providing a possession-based data instance, a biometric-based data instance, and a modified version of the biometric-based data instance. The possession-based data instance is applied to the modified version of the biometric-based data instance to generate a recovered data instance. The recovered data instance against the biometric-based data instance to generate a biometric value as a result of a correspondence evaluation. The possession-based data instance and the biometric value are combined to form an authentication value, which is evaluated to determine if the user's identity is authenticated. The user's access to the system is restricted if the user's identity is not authenticated, based at least in part on the authentication value, and granted if the user's identity is authenticated, based at least in part on the authentication value. Restricting the user's access can include denying the user's access. The modified version of the biometric-based data instance can be a first modified version of the biometric-based data instance, in which case the biometric value is a second modified version of the biometric-based data instance, such as a cryptographic hash of the biometric-based data instance. Restricting the user's access to the system and granting the user's access to the system can be based on a modified version of the authentication value, such as a cryptographic hash of the authentication value.

DETAILED DESCRIPTION OF THE INVENTION

The invention will now be described in more detail by way of example with reference to the illustrative embodiments shown in the accompanying figures. It should be noted that the following described embodiments are only presented by way of example and should not be construed as limiting the inventive concept to any particular configuration or order.

Figure 1:
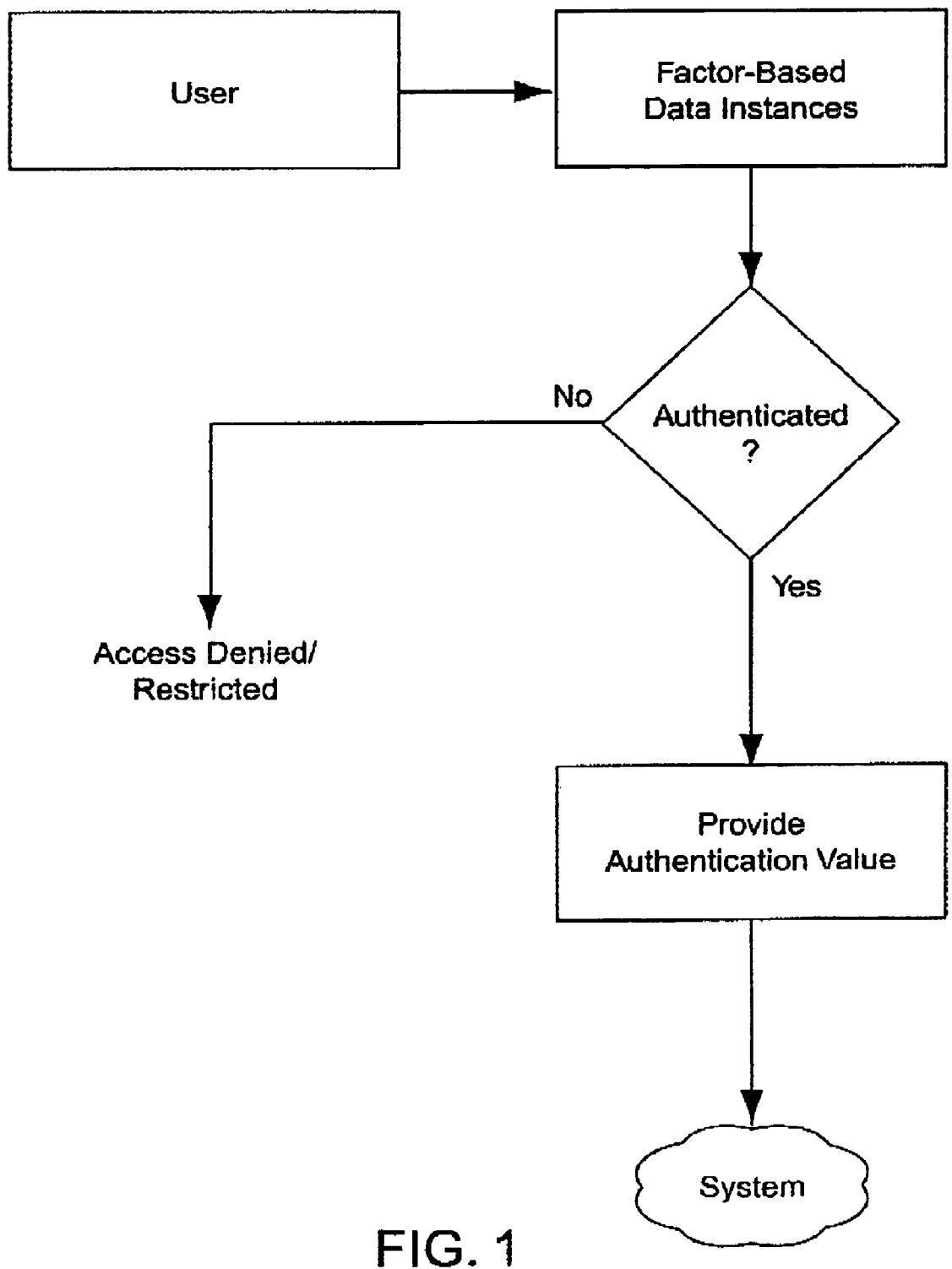
FIG. 1 is a block diagram showing an overview of the identification process of the present invention.

FIG. 1 shows an overview of the present invention, in block diagram form. As shown, a user provides a number of factor-based data instances, which are used to determine the authenticity of the identity of the user in order to authorize his or her access to system resources. If the authentication process fails, access is denied. If the user's identity is authenticated, an authentication value is provided to the system to allow the user access to the appropriate system resources. Alternatively, when the determination is made as to whether the user's identity has been authenticated, this determination result is provided to the system as the authentication value, regardless of the success or failure of the authentication. The system would then respond based on the authentication value, whether to deny access or restrict access to the user.

Figure 2:
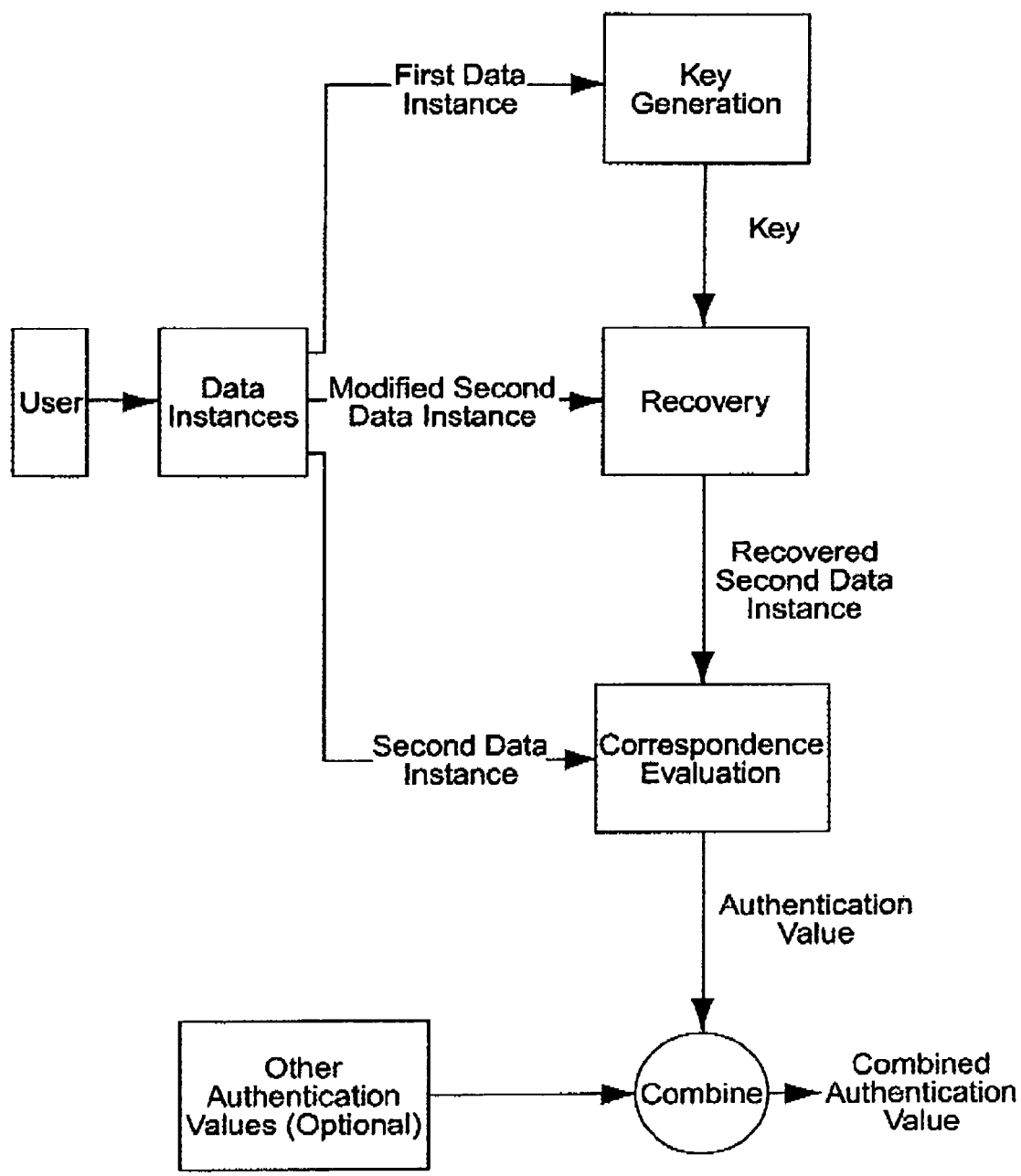
FIG. 2 is a block diagram showing an exemplary process of authenticating the identity of a user.

FIG. 2 shows an exemplary process of authenticating the identity of a user. The user provides a number of factor-based data instances to the identification and authentication process. These data instances can be provided at the time that the authentication determination is being made, or have already been provide in the past. If the factors have already been provided, manipulations can have been performed on one or more of the data instances, such that they are stored in modified form. For example, one or more of the data instances can have been encrypted.

As shown, an exemplary authentication process includes creating a key based on a first data instance. A modified second data instance is provided, which undergoes a manipulation to recover the unmodified second data instance, using the key derived from the first data instance. The unmodified second data instance is provided, and a correspondence evaluation is performed on the unmodified second data instance and the recovered second data instance. The result of the correspondence evaluation is then provided to the system as the authentication value. Alternatively, other correspondence evaluation results are provided and combined in some manner with the first correspondence evaluation, to produce the authentication value.

User identification can be based upon any of many different factors—who you are (biometrics), what you know (knowledge-based data, such as a PIN or pass phrase), and what you possess (a token), where you are (location-based data, such as a geographic or virtual address), and "when you are" (time-based data), for example. Each factor has advantages and disadvantages associated with its use in restricting access to authorized users. In terms of security, a user identification process combining more than one of these factors is stronger than a process that uses just one factor. The present invention provides a method of validating a user for access to a system based on at least two of these factors. The present invention also provides an apparatus that validates a user for access to a system based on at least two of these factors. The present invention also provides a computer-readable medium that stores instructions for controlling a computer to validate a user for access to a system based on at least two of these factors. A validated key is created according to the system of the present invention by binding two or more selected factors, and provided for the user to access the system. A validated key can be used directly, for example, as an access code, or indirectly, for example, to decrypt or allow access to an access code, or as keying data in a key management scheme to access the system.

In the user identification process according to one aspect of the present invention, the goal is to derive a unique value—the Profile Key Encryption Key (PKEK)—from the user identification process. The PKEK is used as a cryptographic key to encrypt and decrypt keying material and critical security parameters. This data must be protected, yet made available to an authorized user and restricted from unauthorized users. Each identification factor contributes a value to the identification process, in some cases a unique value, that is reflected in the final value used to derive the unique PKEK. The process must also be repeatable, that is, result in regeneration of the same PKEK for a successful identification. Furthermore, there should be a way of testing whether the regenerated PKEK is the correct PKEK.

Each of the factors and combinations of factors must be assessed for its usefulness within the identification process. Exemplary factors are discussed below.

Knowledge-Based Factors: A knowledge-based factor such as a PIN, password, or pass phrase can be used to derive a repeatable, unique value. However, knowledge-based factors have security limitations regarding aspects such as usage and management. Generally stronger security can result when a password is combined with other factors for identification.

In regards to a password, policies can be defined, such as password obsolescence, minimum number of characters, and other parameters as an attempt to enforce good password practices. Such policies are well known, and have been set forth in certain guidelines such as, for example, those established in Federal Information Processing Standards (FIPS) Publication 112, dated May 30, 1985. A unique, repeatable value can be derived from a password by using certain algorithms such as, for example, the Public-Key Cryptographic Standards (PKCS) #5 algorithm, or that set forth in U.S. Pat. No. 6,075,865. For maximum effectiveness, it is assumed that only the user knows the password.

Biometric Factors: Biometrics, or biological data, while avoiding some of the limitations associated with a knowledge-based factor, are troublesome in the respect of being able to derive a unique, repeatable value. The derived value from a biometrics measurement is usually generated as an analog value that undergoes an analog-to-digital conversion. The analog values are rarely exactly the same from measurement to measurement. In general, a digital representation of the analog measurement, called a template, is created such that two analog measurements from the same person will result in template values that are "close" to each other. That is, the difference between the two values falls within a predetermined tolerance range. During biometrics verification, if a verification template is close to the enrollment template with some measured assurance, it is determined that the two analog measurements were taken from the same entity. This is the basis of the biometrics identification process. But, the identification process by itself does not yield a repeatable value that can be used to derive a cryptographic key.

The present invention does not provide a method to yield a repeatable value from a biometric process, but can use the biometric template within different user identification models. A cryptographic key can be bound to this template when it is created. This key cannot be derived from the template alone. However, a subsequent biometrics measurement, if successful, will recover this key. This key value can be used in the derivation of the PKEK.

Possession-Based Factors: The token can be any tangible item that is able to store or represent data and that has a hard-coded, (that is, written at fabrication and unchangeable) unique serial number or other identifying value. A mechanism based on use of a unique token number can provide assurance that a correct token was used.

A unique value can be stored on a token. However, this value must be protected yet still allow access by the authorized user. To maintain protection of the unique value during the identification process, a pass phrase or biometric process can be used. An RFID material, such as that described in U.S. Pat. No. 6,229,445, the disclosure of which is incorporated herein by this reference, can also be added to the token to be used in a card identity process, to provide a unique signature from which the token serial number can be derived, but can exhibit similar limitations as found in the biometric solutions. The token serial number can be provided to the user identification process in deriving a PKEK.

The present invention can advantageously use a smart card as a token. For example, an enhanced smart card, such as that described in co-pending U.S. patent application Ser. No. 08/974,843, can be used as a unique token. This particular token provides several features that contribute to the user identification process. For example, a long (128-bit or more) serial number can be securely embedded within. The token includes a processor that is able to use this serial number, which cannot be derived external to the token. If the identification process must be executed external to the token's processor, the serial number should be hashed or otherwise modified for transmission to the host processor. Also, the token can be host to one or more cryptographic processes.

As stated previously, a user identification process that uses multiple factors should be able to combine the strengths of all the factors while avoiding the weaknesses of each factor. There are several variations according to which a user identification process can be configured. Three variations are presented below as examples. Other variations, using different combinations of factors, are possible. The first exemplary embodiment described below features three-factor user identification; the second exemplary embodiment features two-factor user identification (token and biometric); and the third exemplary embodiment features two-factor identification (token and biometric with an encrypted template). These embodiments are presented only as illustrations of the present invention, and are limiting of the scope of the invention. For example, it is contemplated that factors other than those shown in the exemplary embodiments can be added or substituted, that other tokens can be used in place of those shown in the exemplary embodiments, and that biometric instances other than those shown in the exemplary embodiments can be added or substituted.

First Exemplary Embodiment

Figure 3:
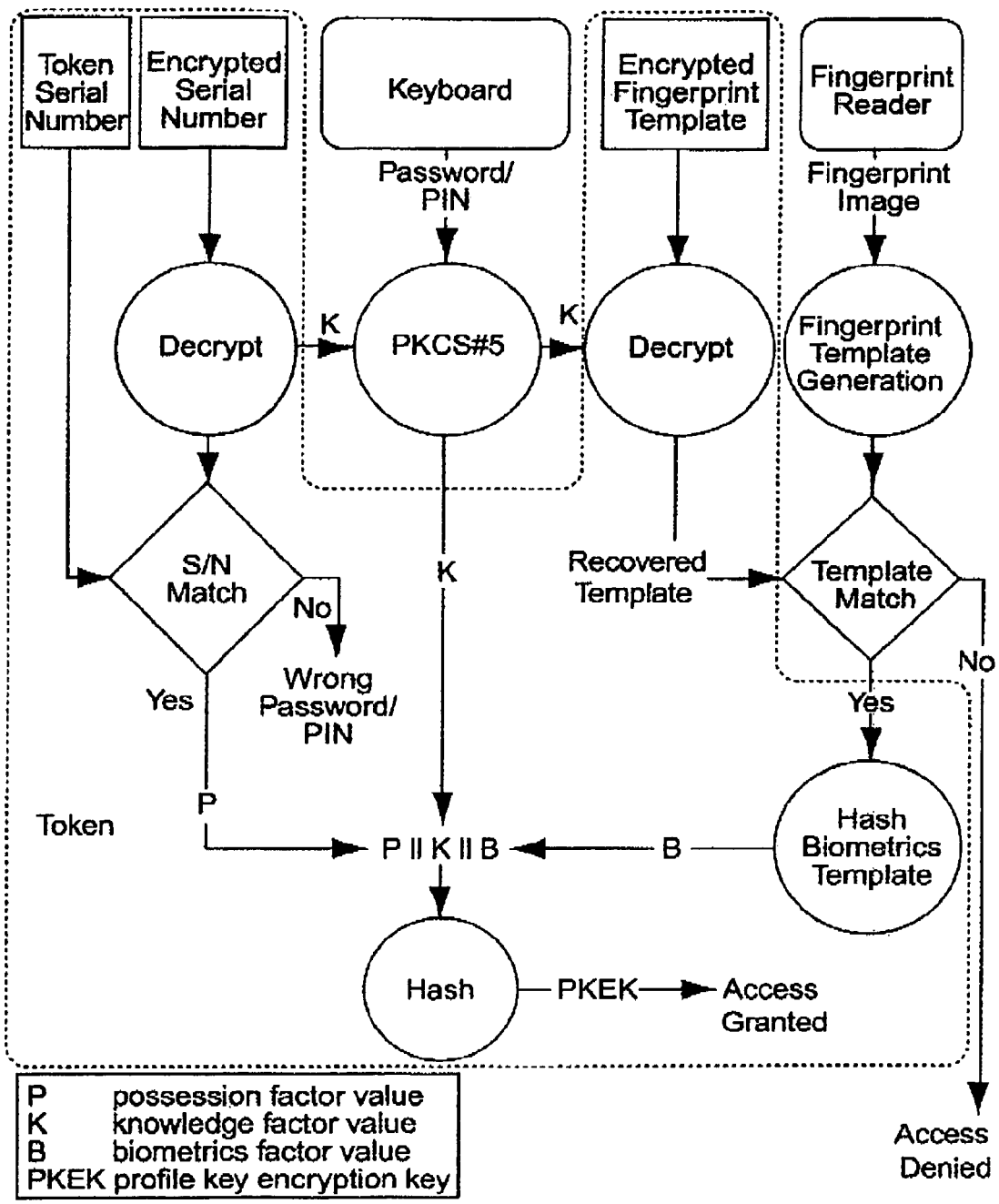
FIG. 3 is a block diagram showing an exemplary three-factor user identification scheme according to the present invention, using a smart token, a password, and fingerprint data, with a template on the token.

As shown in FIG. 3, a first exemplary identification process of the present invention includes knowledge-based, possession-based, and biometric-based factors. In this particular embodiment, these factors take the form of a password/PIN, a token, and a fingerprint reading, respectively. The identification process for a session proceeds as follows.

The user provides a token and a password, either in response to a prompt or unprompted to begin a session. A system algorithm, such as PKCS#5, is used to create a key value, K, from the password. The key K is used to decrypt the encrypted token serial number that is stored on the token. Alternatively, an encrypted member ID, stored on the token, is used as a password check. The decrypted value is compared against the plaintext serial number or the entered member ID. If the two values match or otherwise correspond in a predetermined manner, it is determined that the password has been entered correctly. If there is no correspondence, it is determined that the password has been entered incorrectly, and access is denied. Password policy for the system dictates the procedure at this point. For example, the password entry can be tried again but a count of invalid password attempts is maintained and checked against the maximum number of tries. The policy establishes the number of invalid attempts that can be made before access is totally denied. If a token serial number is used for a successful password check, the decrypted value, P, is used as an input to the PKEK derivation process.

During enrollment, a biometrics template is created for fingerprint verification according to this exemplary embodiment; in other, similar, embodiments, an alternative or additional biometric instance can be utilized. The template is protected by encrypting it with the password-derived key. If plain fingerprint template matching is being used, the enrollment template resides in encrypted form on the token. The key, K, from the password decryption process is used to decrypt this template. If a Bioscrypt™ or similar system, as previously described, is used instead, the template is already in plaintext form and therefore is not decrypted. The password must be available to decrypt the enrollment template before it can be used for successful biometrics verification. The knowledge factor part of the identity process is encryption-enforced, but the biometrics factor part is enforced logically. That is, the encrypted enrollment template is decrypted using the key, K, from the password decryption process. The user inserts a finger in a fingerprint reader at the identification site, where a fingerprint image is read and a verification template is generated. The enrollment and verification templates are compared and evaluated for a match to within the system's predetermined threshold. If the match threshold is not satisfied, access is denied. Subsequent readings can be allowed, according to the system's selected policy, similar to the manner in which repeated password entries can be allowed. Upon successful biometrics verification, the decrypted enrollment template is hashed to produce a hashed template, B, which is used as an input to the PKEK derivation process. If a Bioscrypt™ or similar system is used, then the key resulting from the successful fingerprint match is used as B.

The values P, K, and B are then bound or otherwise combined in some manner, in order to produce the PKEK. This is preferably performed by a processor on-board the token. For example, in the exemplary embodiment shown in FIG. 3, the values P, K, and B are concatenated in that order. A cryptographic hash of the concatenated values is used as the PKEK.

In this embodiment, P, B, and PKEK are generated on the token. The password validity determination and biometric enrollment template decryption functions take place on the token as well. The PKEK preferably stays resident on the token for decryption of keying material and other critical security parameters (CSPs), when needed by the key management system. Domain keying material and CSPs that are needed to operate in a domain reside on the token. Thus, the key management system will prompt the user to provide the token and password whenever token protected (non-public) data or processes are required by an application. The keying material and CSPs are encrypted using a master key that is encrypted with the PKEK. The two-step encryption at this point offers variability to the identification process. A password can change without having to re-encrypt all of the domain keying material and CSPs, and instead require that only the master key be re-encrypted.

Second Exemplary Embodiment

Figure 4:
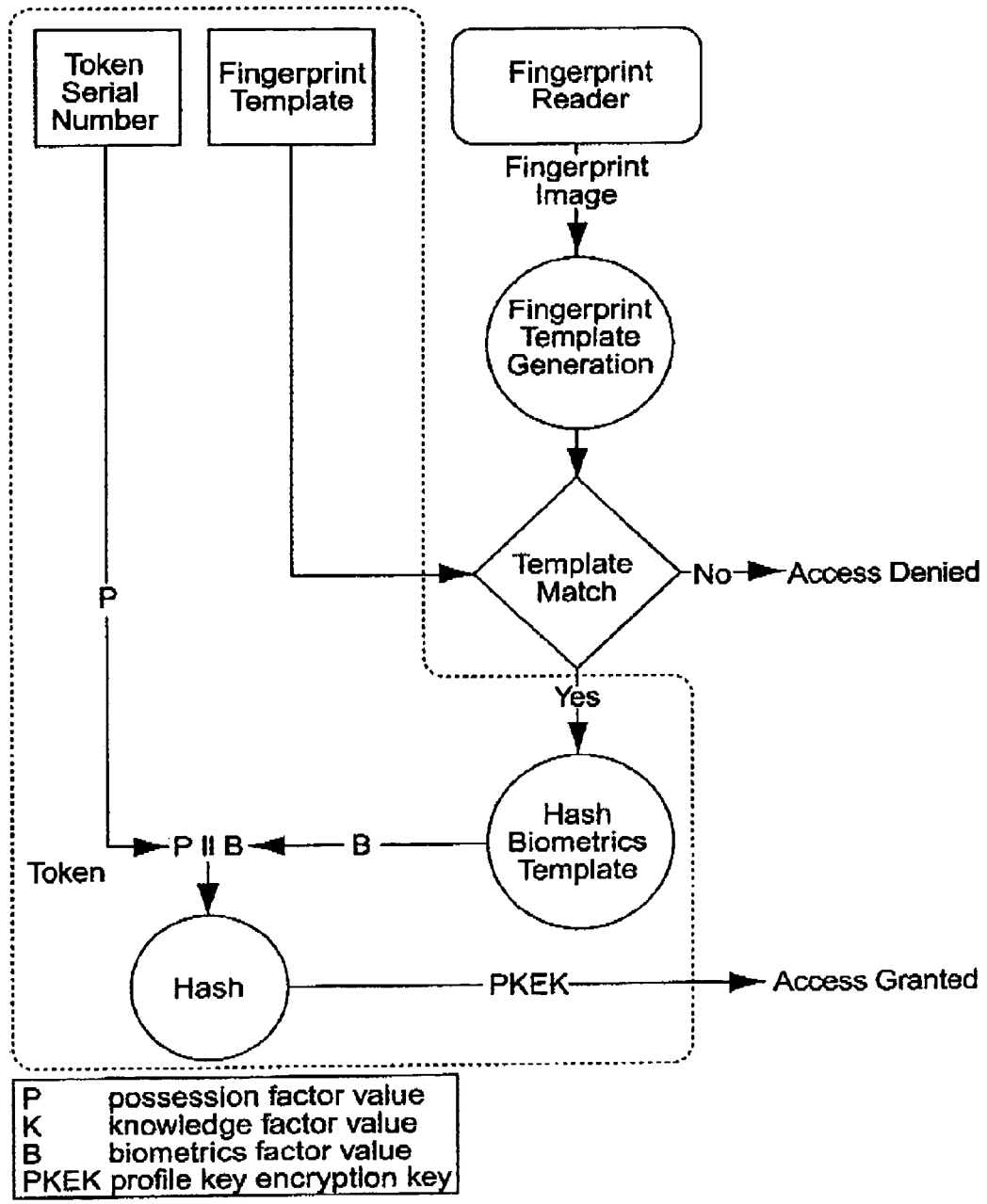
FIG. 4 is a block diagram showing an exemplary two-factor user identification scheme according to the present invention, using a smart token and fingerprint data, with a template on the token.

As shown in FIG. 4, a second exemplary identification process of the present invention includes knowledge-based and biometric-based factors. In this particular embodiment, these factors take the form of a password/PIN and a fingerprint reading, respectively. The identification process for a session proceeds as follows.

The user provides a token, either in response to a prompt or unprompted to begin a session. The token stores a serial number, P, which is used as an input to the PKEK derivation process.

During enrollment, a biometrics template is created for fingerprint verification according to this exemplary embodiment; in other, similar, embodiments, an alternative or additional biometric instance can be utilized. If plain fingerprint template matching is being used, the enrollment template resides on the token. If a Bioscrypt™ or similar system, as previously described, is used instead, this template is stored on the token. The user inserts a finger in a fingerprint reader at the identification site, where a fingerprint image is read and a verification template is generated. The enrollment and verification templates are compared and evaluated for a match to within the system's predetermined threshold. If the match threshold is not satisfied, access is denied. Subsequent readings can be allowed, according to the system's selected policy, similar to the manner in which repeated password entries can be allowed according to the first exemplary embodiment described above. Upon successful biometrics verification, the decrypted enrollment template is hashed on the token to produce a hashed template, B, which is used as an input to the PKEK derivation process. If a Bioscrypt™ or similar system is used, then the key resulting from the successful fingerprint match is used as B.

The values P and B are then bound or otherwise combined in some manner, in order to produce the PKEK. This is preferably performed by a processor on-board the token. For example, in the exemplary embodiment shown in FIG. 4, the values P and B are concatenated in that order. A cryptographic hash of the concatenated values is used as the PKEK.

In this embodiment, B and PKEK are generated on the token. The PKEK preferably stays resident on the token for decryption of keying material and other CSPs, when needed by the key management system. Domain keying material and CSPs that are needed to operate in a domain reside on the token. Thus, the key management system will prompt the user to provide the token and password whenever token protected (non-public) data or processes are required by an application. The keying material and CSPs are encrypted using a master key that is encrypted with the PKEK. The two-step encryption at this point offers variability to the identification process. A password can change without having to re-encrypt all of the domain keying material and CSPs, and instead require that only the master key be re-encrypted.

Third Exemplary Embodiment

Figure 5:
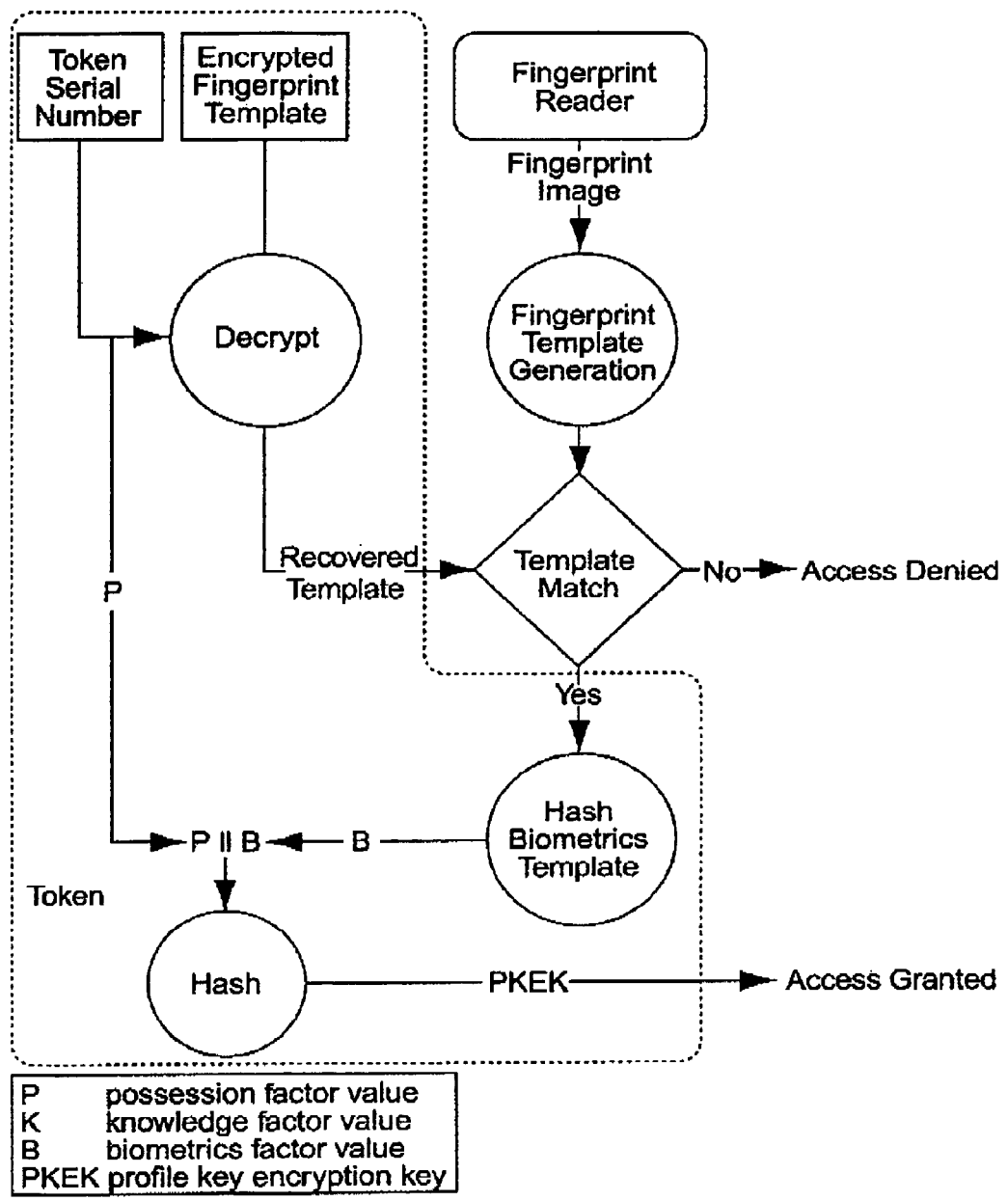
FIG. 5 is a block diagram showing an exemplary two-factor user identification scheme according to the present invention, using a smart token and fingerprint data, with an encrypted template on the token.

As shown in FIG. 5, a third exemplary identification process of the present invention includes knowledge-based and biometric-based factors. This process is similar to that of the previous embodiment; here the fingerprint template is stored in encrypted form on the token, using the token serial number as the key. The token will first decrypt the template before template matching takes place.

In this particular embodiment, these factors take the form of a password/PIN and a fingerprint reading, respectively. The identification process for a session proceeds as follows.

The user provides a token, either in response to a prompt or unprompted to begin a session. The token stores a serial number, P, which is used as an input to the PKEK derivation process.

During enrollment, a biometrics template is created for fingerprint verification according to this exemplary embodiment; in other, similar, embodiments, an alternative or additional biometric instance can be utilized. The template is protected by encrypting it with a key derived from the token serial number, P. If plain fingerprint template matching is being used, the enrollment template resides in encrypted form on the token. If a Bioscrypt™ or similar system, as previously described, is used instead, the template is already in plaintext form and therefore is not decrypted. The serial number must be available to decrypt the enrollment template before it can be used for successful biometrics verification. The encrypted enrollment template is decrypted using the key, P, from the token serial number. The user inserts a finger in a fingerprint reader at the identification site, where a fingerprint image is read and a verification template is generated. The enrollment and verification templates are compared and evaluated for a match to within the system's predetermined threshold. If the match threshold is not satisfied, access is denied. Subsequent readings can be allowed, according to the system's selected policy, similar to the manner in which repeated password entries can be allowed in the first exemplary embodiment. Upon successful biometrics verification, the decrypted enrollment template is hashed to produce a hashed template, B, which is used as an input to the PKEK derivation process. If a Bioscrypt™ or similar system is used, then the key resulting from the successful fingerprint match is used as B.

The values P and B are then bound or otherwise combined in some manner, in order to produce the PKEK. This is preferably performed by a processor on-board the token. For example, in the exemplary embodiment shown in FIG. 5, the values P and B are concatenated in that order. A cryptographic hash of the concatenated values is used as the PKEK.

In this embodiment, P, B, and PKEK are generated on the token. The PKEK preferably stays resident on the token for decryption of keying material and other CSPs, when needed by the key management system. Domain keying material and CSPs that are needed to operate in a domain reside on the token. Thus, the key management system will prompt the user to provide the token and password whenever token protected (non-public) data or processes are required by an application. The keying material and CSPs are encrypted using a master key that is encrypted with the PKEK. The two-step encryption at this point offers variability to the identification process. A password can change without having to re-encrypt all of the domain keying material and CSPs, and instead require that only the master key be re-encrypted.

The particular embodiments described herein are presented to facilitate disclosure of the present invention, and are not limiting of the scope of the invention as contemplated by the inventors. The invention as recited in the appended claims, therefore, should be interpreted to be given the broadest interpretation that is reasonable in vie of the known prior art. Various modifications and variations of the described embodiments fall within the scope of the present invention.

For example, knowledge-based data provided by the user need not be a PIN or password. This data can be any data that is known to the user and that be provided by the user as verification. This data can be connected to another piece of data and provided in response to an inquiry, such as a mother's maiden name, or can have a significance that is known only to the user, such as the word "rosebud". If provided in response to an inquiry, the inquiry and response can change for each session, but in every case the correct response will provide the key or other data instance required by the system.

Likewise, possession-based data need not be stored on the token particularly described herein. The tangible medium on which the possession-based data is stored can also be, for example, a PCMCIA card, a magnetic-stripe card with processing capability (if necessary), a personal data assistant, a laptop computer, any data carrier, a tattoo, a key or watch fob, or any object or device that is capable of storing the possession-based data and providing any additional functionality required of the identification scheme.

Biometric data need not be limited to fingerprint image data. Any biometric data that can be repeatedly, reliably captured and which does not vary appreciably between captures is contemplated as suitable for use with the present invention. For example, the present invention can advantageously use retinal scan data, voice print data, brainwave scan data, handwriting sample data and vector data, and DNA sample data as biometric inputs on which to generate templates.

More than one factor-based data instance of any type can be required. For example, two tokens can be required for certain levels of access, to enforce a rule that more than one person having a specific authority be present before allowing a particular access to occur. Alternatively, according to the exemplary embodiment shown in FIG. 3, the token serial number and the biometric template for a user can be provided on separate tokens rather than one. Likewise, two biometric readings can be required, either from two different users, or two different types of readings from the same user.

Further, other types of data factors can be used, in addition to those described herein or substituted for those described herein. For example, a location-based factor can be used as an input, to convey location information about the user and to restrict system access based on location factors. The location data can relate to a geographical, physical, or virtual location of the user. For example, this data can correspond to longitude, latitude, altitude, Internet protocol address, MAC address, node ID, terminal ID, time zone, country, zip code, area code, or any identifier that can locate a user. This information can be provided automatically, for example, in the case of a terminal ID. The information can be provided by the user, for example, in the case of a zip code or street address. The information can also be provided through the use of an external device, such as a global positioning system (GPS) receiver.

Time-based factors can also be used as inputs to the present invention. This time-based data can correspond to the actual or virtual time of an actual or expected occurrence of an event, such as, for example, when the user is seeking access to a system, the last time the user (or any user) sought access to a system or logged out of a system, or five minutes before a specified event. This time-based data can be measured in any of a number of different ways, such as by counts, units, months, weeks, days, hours, or any other conceivable time units. A user provides time-based data, in a passive or active manner, via a time-measuring or reporting device, such as, for example, a computer clock, a counter, or a material degradation measuring system. User access to a time-measuring device can be limited to prevent spoofing or hacking of time-based data. For example, a time-measuring device can be embedded on a token (such as a smartcard), or located in a secured or remote location.

Concatenation has been presented as an exemplary method of binding two or more values to form an authentication value, such as a PKEK. However, binding can encompass any manner of generating a resultant value from two or more source values in a consistent, repeatable manner. For example, at least a portion of each source value, or a value derived from each source value or referenced by each source value, can combined mechanically (such as by bitwise manipulation) or mathematically (such as by hashing or randomization) in a consistently repeatable manner. Also, binding can be reversible (the bound values are reliably derivable from the resultant value) or irreversible (one or more bound values are not reliably derivable). Further, the level of complexity of binding can range from simple (such as by concatenation) to complex (such as by multiple concatenations, encryptions and references).

Figure 6:
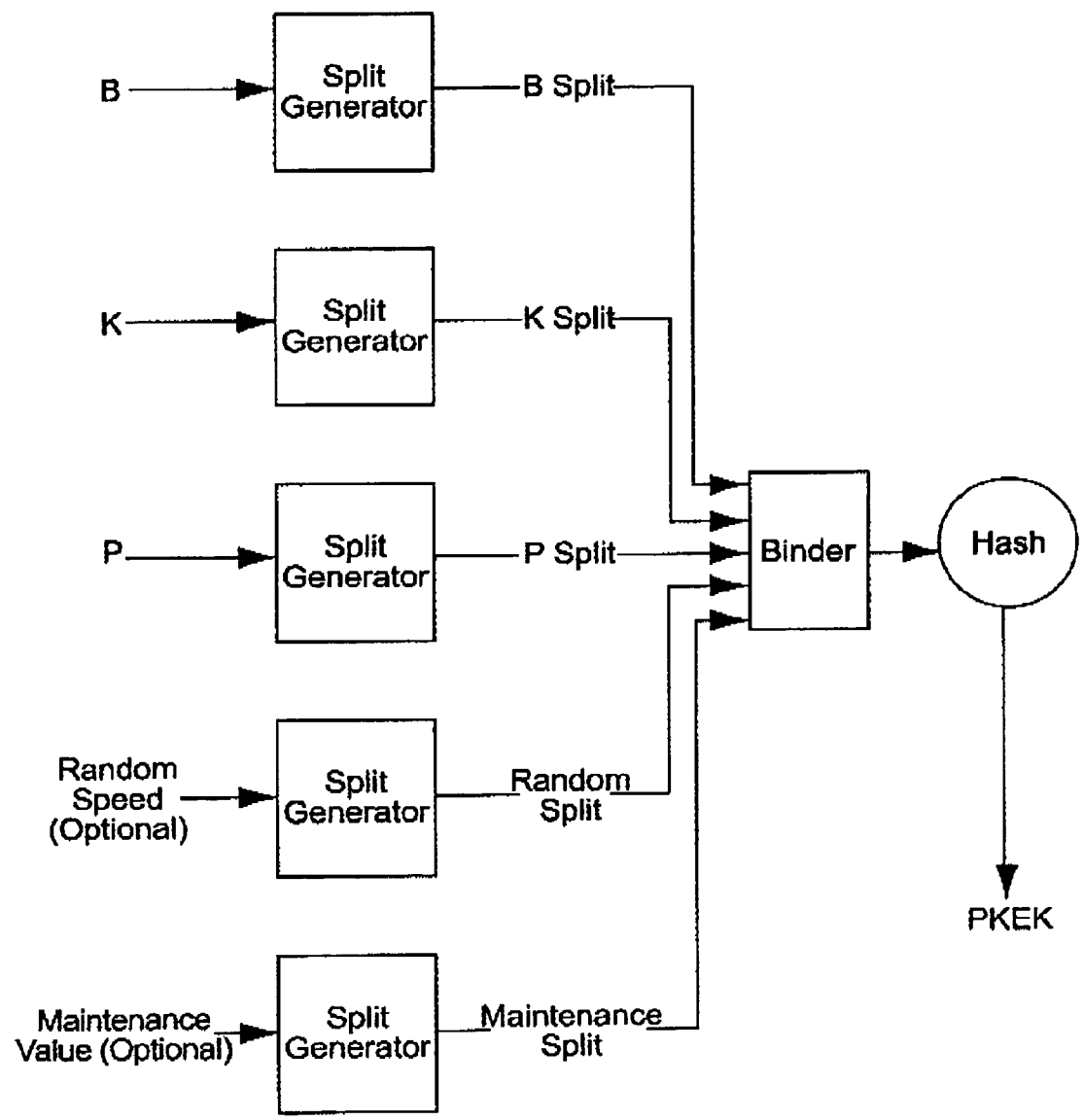
FIG. 6 is a block diagram showing an exemplary binder according to the present invention.

An exemplary form of binding to form a key is described in U.S. patent application Ser. No. 09/023,672, the disclosure of which is incorporated herein in its entirety. As shown in FIG. 6, the source values to be bound are provided to split generators as seeds. The split generators produce split values based on the seeds, according to a function that is predetermined for the split generators. The resulting splits are then combined or bound, for example by randomization. The output value is the bound value of the source values. FIG. 6 shows inputs B, K, and P, representative of outputs of the exemplary embodiment shown in FIG. 3.

The figure also shows optional random and maintenance seed inputs. The random key split can be randomly or pseudo-randomly generated. The maintenance split can be provided to facilitate updates to the system. The manner of binding of the splits is such that the resultant value can take the form of a stream of symbols, a group of symbol blocks, an N-dimensional key matrix, or any other form usable by the particular system.

The optional random split provides a random component to the output. This split is randomly or pseudo-randomly generated based on a seed that is provided by any source as reference data. For example, when a user attempts to log on to a system, the date and time of the user's log-on attempt, represented in digital form, can be used as a seed to generate the split. That is, the seed can be provided to a pseudorandom sequence generator or other randomizer to produce the random split. Such pseudorandom sequence generators are well known in the art. For example, a simple hardware implementation can include a shift register, with various outputs of the register XORed and the result fed back to the input of the register. Alternatively, the seed can be combined, or randomized, with a built-in component, such as a fixed seed stored on the token or elsewhere. The randomization can be performed, for example, by applying an algorithm to the generated seed and the stored fixed seed. This result can be further randomized with, for example, a digital representation of the date and time of the encryption, in order to produce the random split.

The optional maintenance split is derived from a changing value stored at a user space, such as on a system console. Maintenance data, such as the checksum taken from a defragmentation table set, can be used to produce such changing values. For example, the current maintenance data can be randomized with particular previous maintenance data. Alternatively, all previous maintenance data can be randomized with a built-in component stored at the origination space, the results of which are XORed together and randomized with the current maintenance data. The randomization result of the changing value is the maintenance split.

The built-in split components described herein can be static in that they do not change based on uncontrolled parameters within the system. They can be updated for control purposes, however. For example, the built-in split components can be changed to modify the participation status of a particular user. The split component can be changed completely to deny access to the user. Alternatively, only a single prime number divisor of the original split component can be taken from the split component as a modification, in order to preserve a legacy file. That is, the user will be able to access versions of the file created prior to the modification, but will not be allowed to change the file, effectively giving the user read-only access. Likewise, modification of the split component can be effected to grant the user broader access.

Once the splits have been generated, they can be bound together to produce the authentication value. It is contemplated that splits other than those specifically described herein can be combined in forming the authentication value. The total number of splits can also vary, and these splits can be used to build a key matrix to add to the complexity of the system. The authentication value should be in a form suitable for use in the particular system. That is, different fields in the key can have different functions in the protocol of the communication, and should be arranged accordingly within the authentication value.

The hardware required to effect the process of the present invention depends on the factor-based data used by the particular embodiment implementing the invention. For example, if possession-based factors are utilized, a token is required, as well as a token reader. An exemplary token, as pointed out previously, is disclosed in co-pending U.S. patent application Ser. No. 08/974,843, the entire disclosure of which is incorporated herein. The token includes memory and processing capability, as well as an inherent passive RF signature formed by randomly shaped, sized, and placed pieces of metallic matter embedded in the substrate of the token itself. Signatures of this type, present on tokens, are also disclosed in U.S. Pat. No. 6,229,445, the entire disclosure of which is incorporated herein.

Also, if biometric-based data is utilized, a biometric reader for capturing the particular data (for example, fingerprint reading, retinal scan, voice characteristic) must be used (for example, fingerprint reader, retinal scanner, microphone, respectively). Also, any necessary hardware or software for converting the raw biometric data to usable digital data must be present.

Much of the processing of data performed to implement the process of the present invention is done on a token, when possession-based factors are utilized. However, other functions, for example, the biometric verification, take place off the token. Also, if possession-based factors are not part of the particular identification and authentication embodiment used under the present invention, other functionality necessarily must be performed other than on a token. As is well known to those of skill in the art, these functions can be performed by a computer, or any other device having sufficient processing capability, such as a personal data assistant or a telephone. Further, the instructions utilized to cause the processing device to perform the necessary functionality can be stored on any computer-readable medium, such that the instructions are provided to the processing device at such time as any of the various embodiments of the process of the present invention are to be performed.

What is claimed is:

1. A method of authenticating the identity of a user to determine access to a system, comprising:
   providing a token having a possession-based data instance corresponding to the token, an encrypted biometric reference-based data instance corresponding to the user, and an encrypted identifying data instance corresponding to at least one of the token and the user;
   providing a knowledge-based data instance corresponding to the user;
   applying a predetermined algorithm to the knowledge-based data instance to generate a knowledge factor value;
   providing the knowledge factor value to the token;
   using the knowledge factor value to decrypt the encrypted identifying data instance;
   comparing the decrypted identifying data instance to the possession-based data instance;
   providing a possession factor value based on the decrypted identifying data instance only if the decrypted identifying data instance corresponds to the possession-based data instance;
   using the knowledge factor value to decrypt the encrypted biometric reference-based data instance;
   providing a biometric sample-based data instance corresponding to the user;
   comparing the decrypted biometric reference-based data instance to the biometric sample-based data instance;
   providing a biometrics factor value to the token based on the biometric reference-based data instance only if the decrypted biometric reference-based data instance corresponds to the biometric sample-based data instance;
   binding the possession factor value, the knowledge factor value, and the biometrics factor value;
   generating a key based on the bound possession factor value, knowledge factor value, and biometrics factor value; and
   granting system access to the user based on validity of the key;
   wherein the key is valid only if each of the possession factor value, the knowledge factor value, and the biometrics factor value is valid.

2. The method of claim 1, wherein the encrypted biometric reference-based data instance is an encrypted template, wherein the template includes data corresponding to biometric enrollment samples provided by the user.

3. The method of claim 1, wherein the biometric sample-based data instance includes a template that includes data corresponding to biometric samples provided by the user.

4. The method of claim 1, wherein generating a key based on the bound possession factor value, knowledge factor value, and biometrics factor value includes hashing the bound values.

5. An arrangement for controlling access to a system by a user, comprising:
   an input device that enters a knowledge-based data instance;
   a memory device storing a predetermined algorithm;
   a processor that applies the algorithm to the knowledge-based data instance to generate a knowledge factor value;
   a biometric sampling device that provides a biometric sample-based data instance corresponding to the user;
   a biometric comparator that compares a decrypted biometric reference-based data instance to the biometric sample-based data instance to generate a biometric comparison result; and
   a token;
   wherein the token includes
      a possession-based data instance corresponding to the token,
      an encrypted identifying data instance corresponding to at least one of the user and the token,
      a first decrypt engine that decrypts the encrypted identifying data instance using the knowledge factor value to provide a decrypted identifying data instance,
      a token comparator that compares the possession-based data instance to the decrypted identifying data instance to provide a possession factor value if the comparison is favorable,
      an encrypted biometric reference-based data instance corresponding to the user,
      a second decrypt engine that decrypts the encrypted biometric reference-based data instance using the knowledge factor value to provide the decrypted biometric reference-based data instance to the biometric comparator,
      a first hash engine that performs a hash function on the decrypted biometric reference-based data instance if the biometric comparison result is favorable, to generate a biometrics factor value,
      a binder that binds the possession factor value, the knowledge factor value, and the biometrics factor value, and
      a second hash engine that performs a hash function on the bound factor values to generate a key;
   wherein system access is granted to the user based on validity of the key; and
   wherein the key is valid only if each of the possession factor value, the knowledge factor value, and the biometrics factor value is valid.

6. The arrangement of claim 5, wherein the encrypted biometric reference-based data instance is an encrypted template, wherein the template includes data corresponding to biometric enrollment samples provided by the user.

7. The arrangement of claim 5, wherein the biometric sample-based data instance includes a template that includes data corresponding to biometric samples provided by the user.

8. The arrangement of claim 5, wherein the token is a smart card.

* * * * *